(12) United States Patent
Lee

(10) Patent No.: US 6,714,522 B1
(45) Date of Patent: Mar. 30, 2004

(54) WIRELESS LOCAL LOOP SYSTEM USING CDMA METHOD

(75) Inventor: Kyung Kuk Lee, Seoul (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/223,748

(22) Filed: Dec. 31, 1998

(30) Foreign Application Priority Data

Dec. 26, 1998 (KR) .............................. 98-58707

(51) Int. Cl.[7] .............................. H04B 7/185
(52) U.S. Cl. .................. 370/318; 370/347; 455/13.4
(58) Field of Search ................. 370/252, 311, 370/318, 320, 335, 342, 441, 412, 428, 429, 479, 321, 336, 347, 442; 455/13.4, 522

(56) References Cited

U.S. PATENT DOCUMENTS

| | | | | |
|---|---|---|---|---|
| 5,710,985 A | * | 1/1998 | Matsumoto .................. | 455/89 |
| 6,072,784 A | * | 6/2000 | Agrawal et al. ............. | 370/311 |
| 6,108,317 A | * | 8/2000 | Jones et al. ................. | 370/320 |
| 6,134,423 A | * | 10/2000 | Wiedeman et al. ......... | 455/117 |
| 6,137,789 A | * | 10/2000 | Honkasalo .................. | 370/342 |
| 6,204,813 B1 | * | 3/2001 | Wadell et al. .............. | 342/463 |
| 6,298,095 B1 | * | 10/2001 | Kronestedt et al. ......... | 375/295 |

* cited by examiner

*Primary Examiner*—Dang Ton
*Assistant Examiner*—Phuc Tran
(74) *Attorney, Agent, or Firm*—Fleshner & Kim, LLP

(57) ABSTRACT

A WLL (wireless local loop) system using a CDMA (code division multiple access) method includes a data transmitter, a data receiver, a data transmission/reception buffer, and a controller. The system implements a voice and data communication which includes the steps of performing a voice communication through a plurality of voice communication channels assigned to respective subscribers by a circuit switching method during a transmission/reception of the voice signal, and performing a data communication by a packet switching method in a way in which a plurality of subscribers share in common predetermined data communication channels during the transmission/reception of the data signal. The WLL system permits a plurality of subscribers to share in common the preset data exclusive channel so as to effectively employ limited frequency when transmitting data communication while interrupting power transmission when there is no data for transmission, thereby decreasing power consumption and improving system efficiency.

21 Claims, 8 Drawing Sheets

WIRELESS LOCAL LOOP SYSTEM USING CDMA METHOD

BACKGROUND OF THE INVENTION

1. Field of the Invention

The present invention relates to a wireless local loop system, and more particularly, to an improved data transmission/reception apparatus for a WLL system using a CDMA method.

2. Description of the Background Art

In general, a wireless local loop (hereinafter, "WLL") system employs a wireless communication network instead of wired network, between subscribers' terminals and a telephone company and enables data communication, i.e., internet, as well as voice communication using traffic channels.

FIG. 1 is a schematic block diagram illustrating a general WLL system. As shown therein, the system includes voice purpose or data purpose terminals 10, a subscriber' radio interface unit 20 interfaced to the terminals 10, a base station 30 for wireless data reception/transmission with the subscriber's radio interface unit 20, a base station controller 40 for controlling the base station 30, and a WLL switching center 50 for forming a wired communication pathway to enable a voice or data communication for example through internet via PSTN (Public Switched Telephone Network) or PSPDN (Public Switched Packet Data Network).

More specifically, the subscriber's radio interface unit 20 performs a wireless interface between the base station 30 and the subscriber's terminal 10 and it is connected to a telephone set, facsimile machine or computer through an analog or digital data path so as to enable voice and data service.

The base station 30 is interfaced to the base station controller 40 and it is interfaced through wireless channel to the subscriber's radio interface unit 20 so as to form a data path from the base station controller 40 to the subscriber's radio interface unit 20.

The base station controller 40 performs major roles of the WLL system such as a call processing for a reception/transmission signal, base station management and voice signal compression. The WLL switching center 50 serves to interface telephone network or data network (PSTN/PSPDN) with wireless subscribers' network.

FIGS. 2 and 3 specifically illustrate the subscriber's radio interface unit 20 and the base station 30, wherein the two apparatuses 20, 30 carry out similar performance with similar construction.

First, as shown in FIG. 2, the subscriber's radio interface unit 20 includes a duplexer 21 for switching transmission/reception signals, an RF receiver 22 for down-converting the signal from the duplexer 21, a demodulator 23 for demodulating the down-converted signal, a decoder 24 for decoding the demodulated signal, a vocoder 29 connected to a voice class terminal and for encoding a voice signal, a DPU (Data Port Unit) 28 serving as a terminal connection apparatus for data, an encoder 27 for performing a convolutional coding with regard to a voice signal or data signal from the DPU 28 or the vocoder 29, a modulator 26 for modulating the encoded signal, and an RF transmitter 25 for up-converting the modulating signal.

The RF receiver 22 includes a BPF (Band Pass Filter) 22-1 for filtering a signal received through the duplexer 21, a LNA (Low Noise Amplifier) 22-2 for amplifying the filtered signal into low noise, and a down converter 22-3 for down-converting the amplified signal into a low pass band signal.

Also, the RF transmitter 25 includes an up converter 25-1 for up-converting the signal from the modulator 26 into a high frequency signal, a PA (Power Amplifier) 25-2 for amplifying the frequency-converted signal to a predetermined level, and a BPF 25-3 for filtering the amplified signal.

As further shown in FIG. 3, the base station 30 is similar in construction and operation to the subscriber's radio interface unit 20 in FIG. 2 and its description will be omitted, accordingly.

With reference to FIGS. 1 through 3, the conventional voice or data transmission/reception steps for a WLL system will now be described.

Initially, according to the data transmission steps from a subscriber's side, the voice signal from a voice class terminal such as a telephone set is converted to a PCM (Pulse Code Modulation) signal through a vocoder 29 and applied to the encoder 27 through the PCM bus. The data signal from the data-purposed terminal such as a PC (personal computer) is applied to the encoder 27 through the DPU 28.

Then, the encoder 27 converts the applied PCM signal to a convolutional code, and the converted signal is modulated by the modulator 26 and applied to the RF transmitter 25. The applied signal is converted to a high frequency signal by the up converter 25-1 and amplified to a predetermined power level demanded through the PA 25-2 and it is also filtered through the BPF 25-2 and transmitted into a free space.

The base station receives the data from the subscriber' side according to the aforementioned steps and its wireless communication steps will now be explained.

The signal received via the antenna through the free space is applied through the duplexer 31 to the RF receiver 32, and the RF receiver 32 filters the signal received through the duplexer 31 and amplifies the filtered signal to the LNA, thereby down-converting the amplified signal to a low pass band signal.

The down-converted signal is demodulated by the demodulator 33 and decoded by the decoder 34. Then, the voice signal passes through the PSTN and the data signal passes through the PSPDN, thereby enabling the subscriber to perform data communication with another subscriber or internet network. Those steps are similarly carried out when transmitting data from a base station to a subscriber.

The conventional WLL system employs a circuit switching method to implement the transmission/reception of voice or data. According to the circuit switching method, when an exchanger starts interfacing from a signal-transmitting terminal, a channel to a signal-receiving terminal is determined and the channel is seized until the communication is terminated, thereby transmitting/receiving communication information. For example, a telephone network follows the circuit switching method.

FIG. 4 is a flow chart schematically illustrating data transmitting/receiving steps in the conventional WLL system. As shown therein, the base station determines whether a hook off/on signal is output from a subscriber's terminal for notifying a communication start/end in step Si. When the hook off signal notifying a communication start is transmitted, it is identified whether there is an unoccupied channel in step S2. When all the channels are in use, a busy tone is generated and transmitted to the terminal in step S3 and when there are unoccupied channels, one of the unoccupied channels is assigned in step S4.

Then, in step S5 the terminal serves to transmit voice or data through the assigned channel, wherein the assigned channel remains seized until the voice or data communication is terminated, that is, until the hook on signal is sensed.

The thusly operating conventional WLL system permits simultaneously communicable multiple channels to be assigned to a single base station. The respective base stations form wireless communication channels between subscribers using down-converting and up-converting different frequencies through a plurality of limited channels.

The subscribers-housing capacity per base station in the conventional WLL system is presumed to range 10 times as large as the wireless channel number. Here, the subscribers include telephone subscribers using voice communication, fix subscribers, and data communication subscribers interfaced to personal computers and work stations for internet or data communication.

The reason why the subscribers capacity is assumed to be ten times as large as the channel number is that voice communication subscribers generally terminate the communication within 3 minutes according to local statistics in South Korea.

In the WLL system performing a data communication as well as a voice communication, if the concentration is set on the basis of voice communication time period to include data communication subscribers, there may inevitably occur communication circuit shortage. In case of data communication, the communication time period is significantly long, compared to the voice communication.

Also, in case of data communication, the data transmitting/receiving time period which is practically taken to terminate the data communication from the start of interfacing is relatively short so that a channel-seizing method may disadvantageously leave some channels unused due to the channel seizure from start to end.

SUMMARY OF THE INVENTION

The present invention is directed to overcoming disadvantages of the conventional WLL system.

Therefore, it is an object of the present invention to provide a data transmission/reception method for a WLL system wherein a data exclusive channel is assigned for common use of multiple subscribers and the data communication is implemented through the data communication channel using a packet exchange method.

To achieve the above-described object, there is provided a WLL (wireless local loop) system using a CDMA (code division multiple access) method according to the present invention which includes a data transmitter, a data receiver, a data transmission/reception buffer, and a controller. The system implements a voice and data communication including the steps of performing a voice communication through a plurality of voice communication channels assigned to respective subscribers by a circuit switching method during a transmission/reception of the voice signal, and performing a data communication by a packet switching method in a way in which a plurality of subscribers share in common predetermined data communication channels during the transmission/reception of the data signal.

The features and advantages of the present invention will become more readily apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
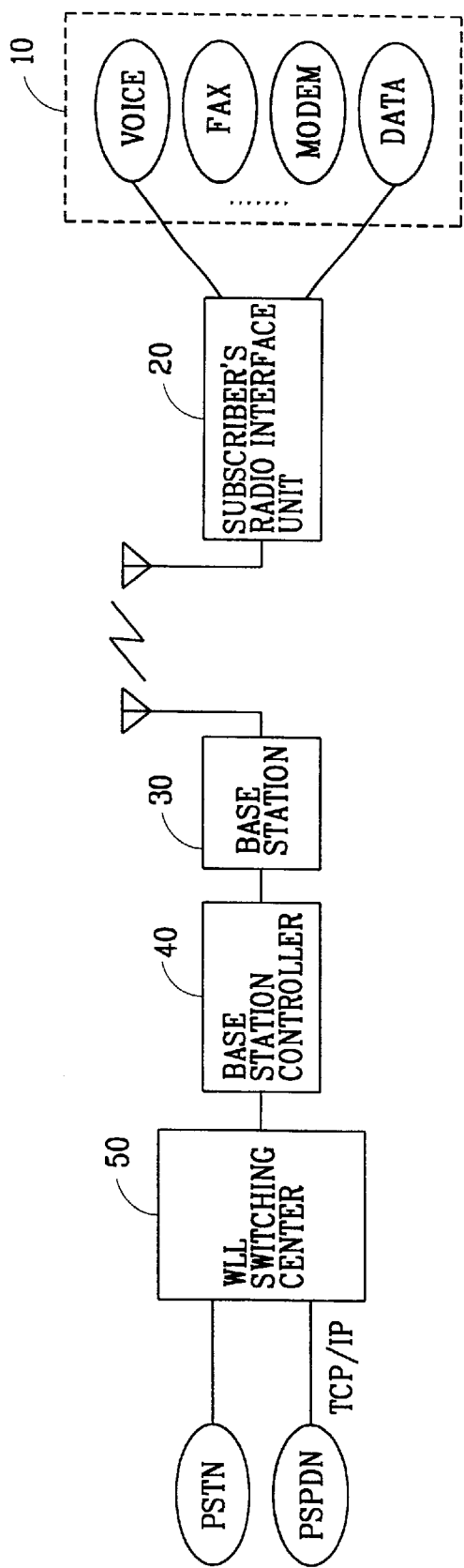
FIG. 1 is a schematic block diagram illustrating a general WLL system.
Figure 2:
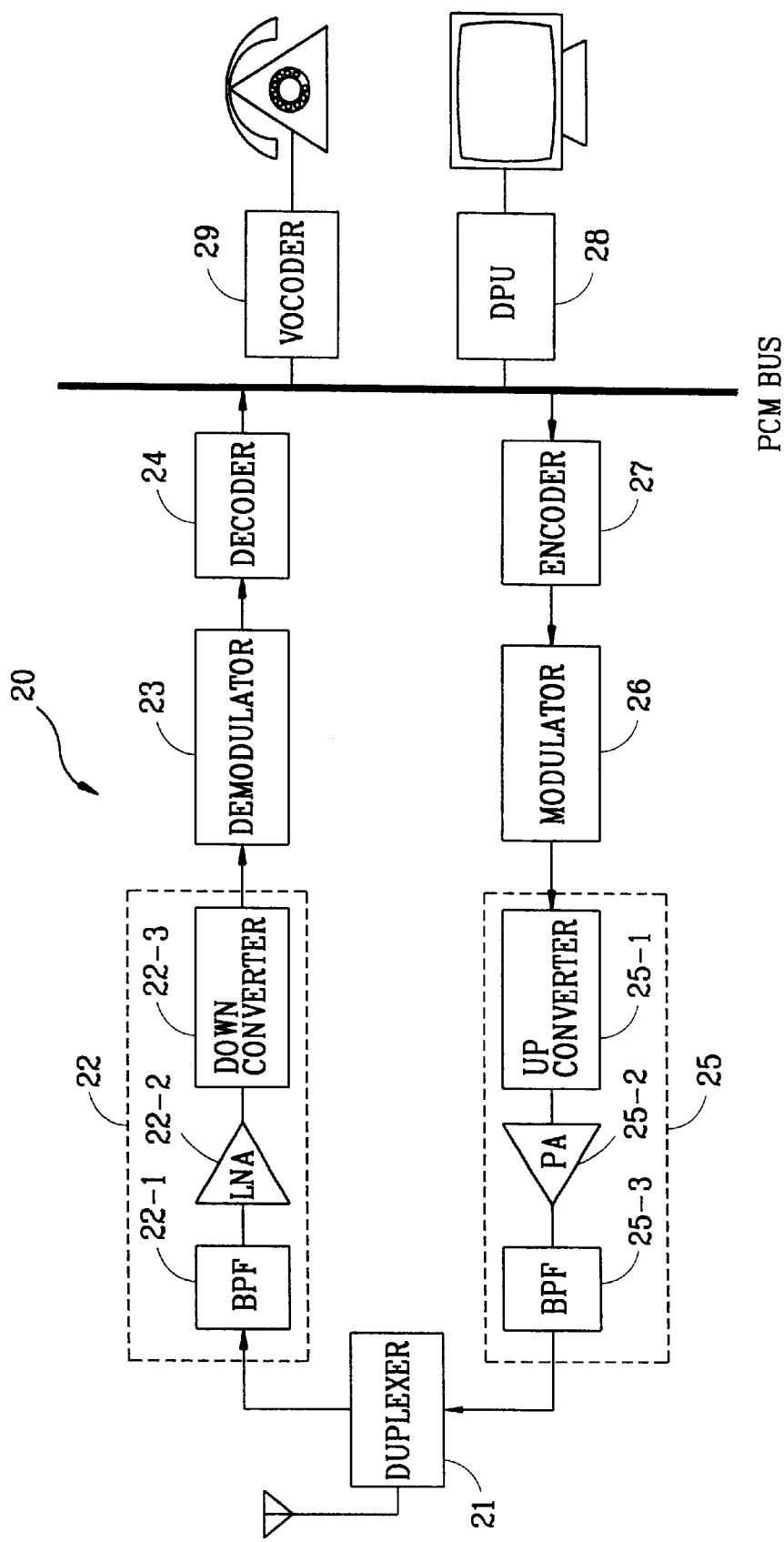
FIG. 2 is a block diagram detailing a subscriber's radio interface unit for a conventional WLL system.
Figure 3:
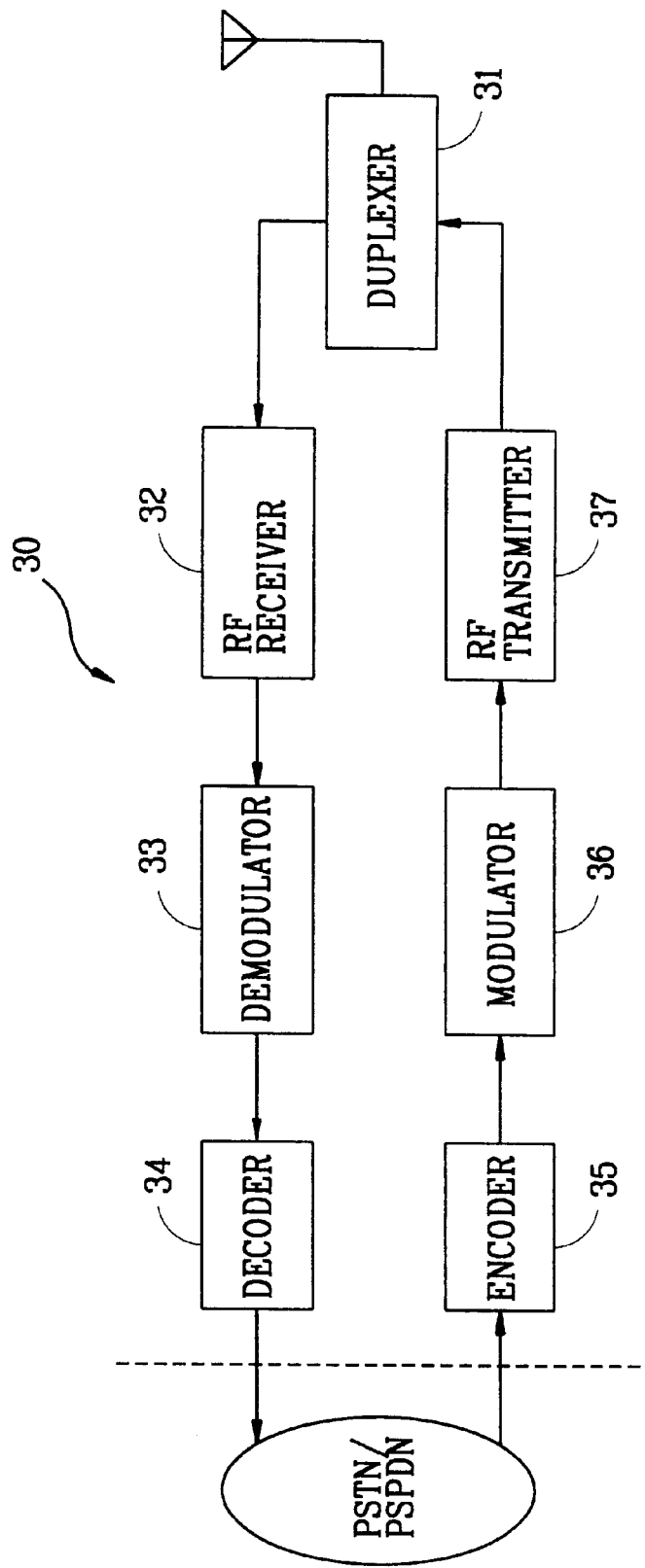
FIG. 3 is a block diagram detailing a base station's radio interface unit for the conventional WLL system.
Figure 4:
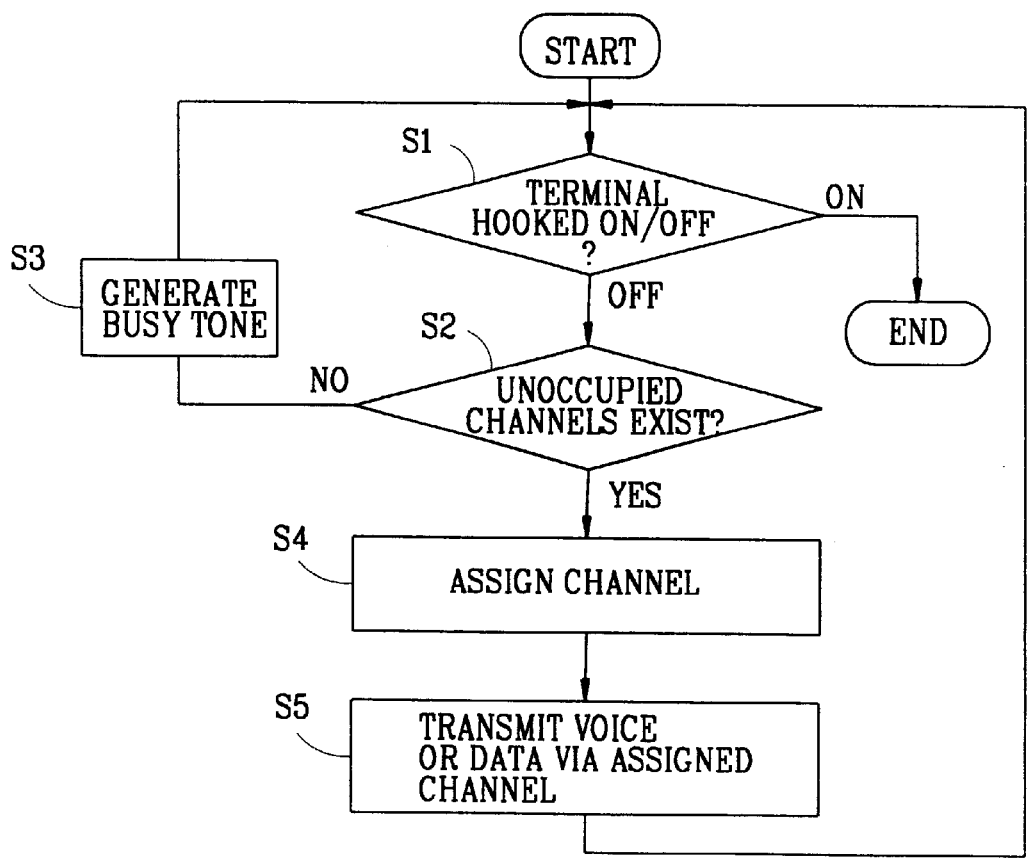
FIG. 4 is a schematic flow chart illustrating a voice or data transmission process for the conventional WLL system.
Figure 5:
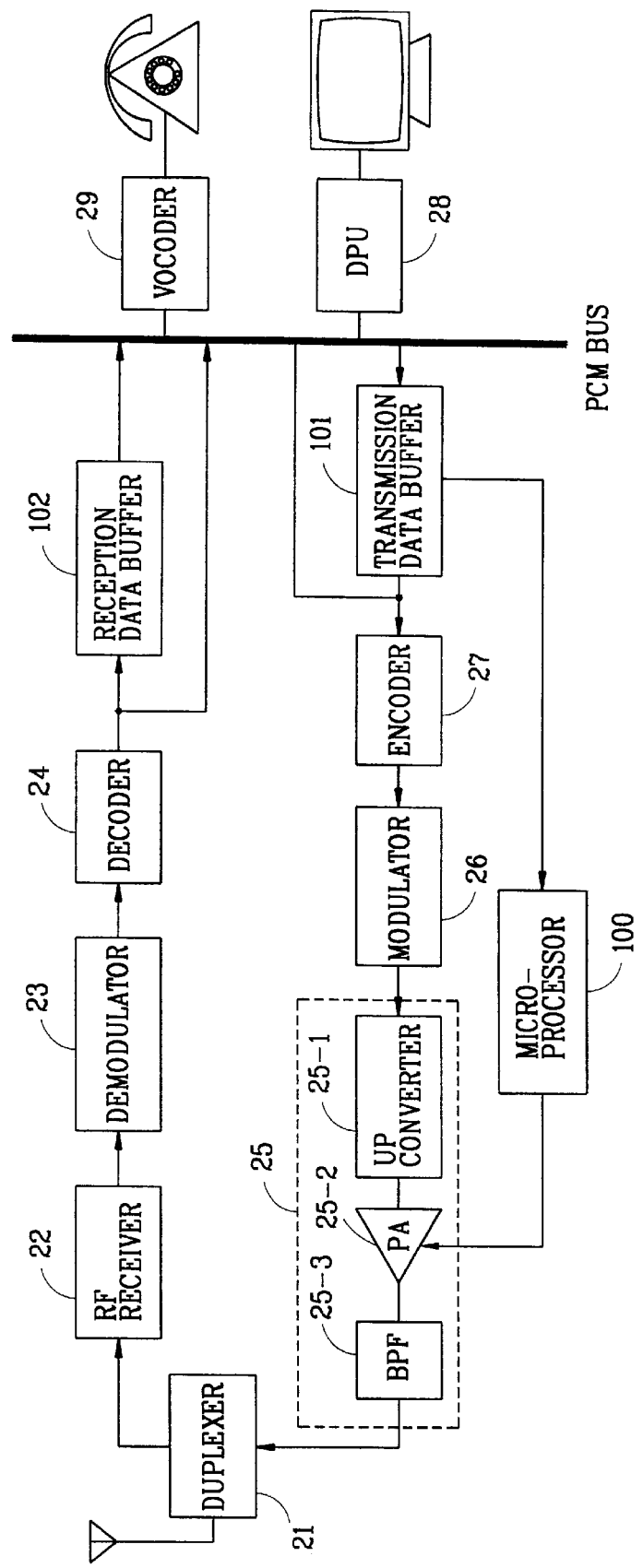
FIG. 5 is a block diagram illustrating a subscriber's radio interface unit for a WLL system according to t preferred embodiment of the present invention.

FIG. 5 is a block diagram illustrating a subscriber's radio interface unit for a WLL system according to t preferred embodiment of the present invention. As shown therein, the apparatus includes a transmission data buffer 101 for temporarily storing therein data from DPU 28, a microprocessor 100 for controlling the gain of the PA 25-2 in accordance with the state of the transmission data buffer 101, and a reception data buffer 102 for temporarily storing therein data from the decoder 24. The other blocks in FIG. 5 are identical to those of the conventional art and accordingly identical numerals are assigned thereto.

Figure 6:
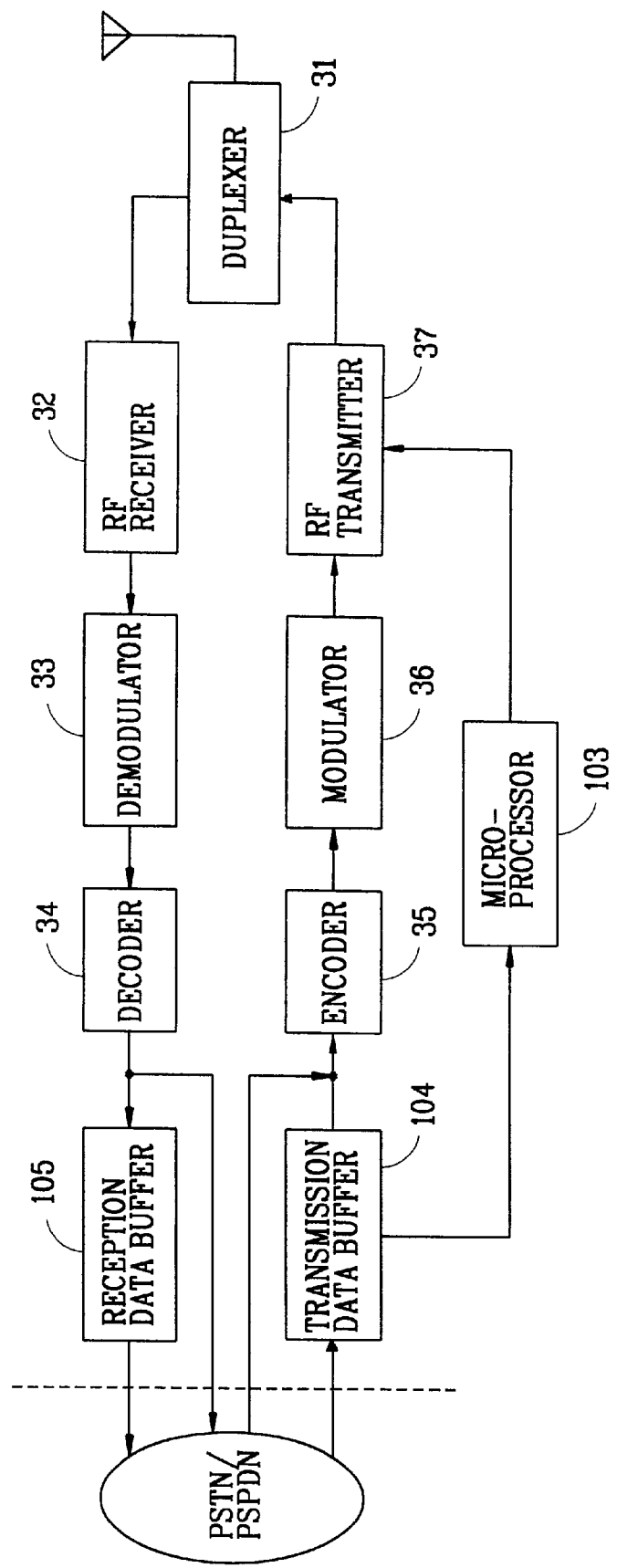
FIG. 6 is a block diagram illustrating a base station's radio interface unit for a WLL system according to t preferred embodiment of the present invention.

Also, FIG. 6 is a block diagram illustrating a base station's radio interface unit for a WLL system according to t preferred embodiment of the present invention. As shown therein, the base station's radio interface unit includes transmission/reception data buffers 104, 105 and a microprocessor 103 for controlling transmission power.

The operation of the data transmission/reception apparatus for a WLL system according to the preferred embodiment of the present invention will now be described with reference to the accompanying drawings.

First, in order to implement the present invention, voice channels and data exclusive channels are separately assigned in the respective base stations. The previously assigned data exclusive channels are allocated to a plurality of data communication subscribers within the same base station so that the data communication subscribers can preferably implement the data transmission/reception through the data exclusive channels during the data communication.

In other words, general telephone subscribers implement voice communication through voice channels separately assigned thereto according to a circuit exchange method, whereas data communication subscribers share data exclusive channels separately assigned to implement the data communication according to a packet exchange method.

The embodiment of the present invention as shown in FIGS. 5 and 6 permits the voice communication to be implemented in the same way as the conventional art and its description will be omitted, accordingly. Instead, the data communication will now be described in detail.

In case of data transmission steps from a subscriber's side, the data transmitted from the data purpose terminal through the DPU 28 is stored in the transmission data buffer 101, synchronized to an 8-bit time slot pulse and applied to the encoder 27.

Figure 7:
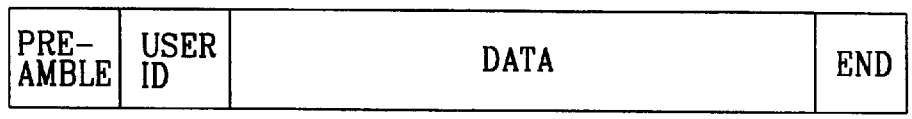
FIG. 7 is a view illustrating a packet data pattern according to the present invention.

Here, the transmission data are transmitted, as shown in FIG. 7, according to a packet data pattern in which a subscriber's ID is included depending upon a preset protocol.

The signal convolutional-coded by the encoder 27 is modulated to a data purpose channel code previously assigned by the modulator 26 and applied to the RF transmitter 25. Here, the data purpose channel code represents a previously assigned channel code for implementing a data transmission/reception by being shared in common with a plurality of subscribers within the same base station.

The signal applied to the RF transmitter 25 is initially converted to a high frequency signal by the up converter 25-1, amplified to a predetermined power level demanded through the PA 25-2, filtered through the BPF 25-3 and transmitted via the duplexer 21 through an antenna into a free space.

The microprocessor 100 monitors the transmission data buffer 101 and interrupts power transmission by controlling the gain of the PA 25-2 to "0" when the transmission data buffer 101 is empty.

The base station receives the data from a subscriber's side in the same process as the above and implements the radio communication, and their steps will now be described.

The signal received in the free space via the antenna is applied through the duplexer 31 to the RF receiver 32 and the RF receiver 32 filters the signal received through the duplexer 31 and amplifies to LNA so as to down-convert the amplified signal to a low band signal.

The down-converted signal is modulated to a preset data purpose channel code by the demodulator 33 and decoded by the decoder 34, thereby implementing data communication service, such as internet, through the PSPDN in accordance with a TCP/IP protocol.

Figure 8:
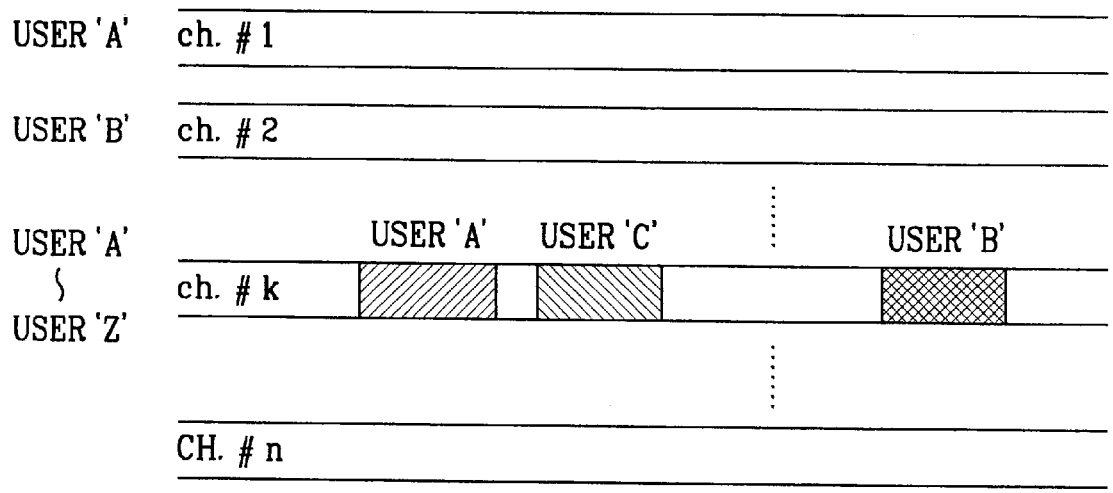
FIG. 8 is a view illustrating an example of channel assignment according to the present invention.

FIG. 8 is a view illustrating an example of channel assignment according to the present invention, wherein it is assumed that one particular channel ch.#k among n channels is determined as a data purpose channel. As described therein, the data purpose channel ch.#k is shared in common with a plurality of subscribers A~Z and their data are respectively transmitted in a packet pattern, and the other voice channels (ch.#1~ch.#n other than ch.#k) are seized by one subscriber from the start and end of the communication.

Figure 9:
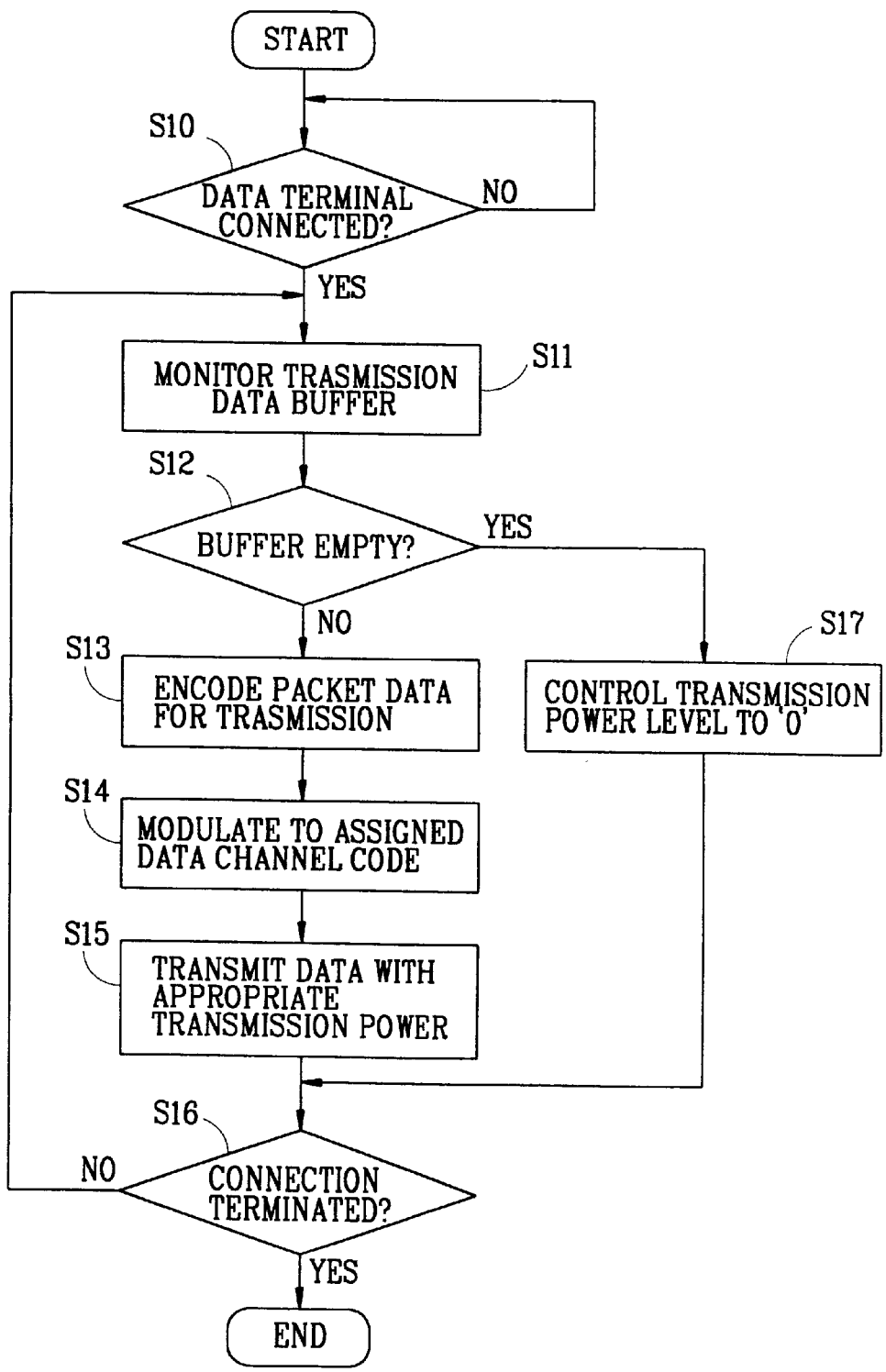
FIG. 9 is a flow chart illustrating a packet data transmission process for a WLL system according to the present invention.

Also, FIG. 9 is a flow chart illustrating a packet data transmission process for a WLL system according to the present invention. As shown therein, it is determined whether the data terminal is connected in step S10. When the terminal is connected, the microprocessor monitors the transmission data buffer in step S11 so as to determine whether there is data for transmission.

When it is determined that there is no data for transmission, the transmission power of the RF transmitter is adjusted to "0" to interrupt the power transmission in step S17.

Meanwhile, when it is determined that there is data for transmission, the data is encoded in step S13 and the encoded data is modulated to a preset data purpose channel code in step S14, thereby transmitting the data in an appropriate power level in step S15.

Until the data terminal connection is terminated, the steps from S11 to S15 are repeated for implementation of the data transmission.

As described above, the WLL system according to the present invention permits a plurality of subscribers to share in common the preset data exclusive channel so as to effectively employ limited frequency when transmitting data communication while interrupting power transmission when there is no data for transmission, thereby decreasing power consumption and improving system efficiency.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within meets and bounds of the claims, or equivalences of such meets and bounds are therefore intended to embrace the appended claims.

What is claimed is:

1. A wireless local loop (WLL) system using a code division multiple access (CDMA) method, comprising:
   a voice interface unit (VIU) that provides an interface with a voice purpose terminal;
   a data port unit (DPU) that provides an interface with a data purpose terminal;
   a data transmission buffer that temporarily stores therein data from the DPU;
   a CDMA modulator that respectively modulates a digital signal from the VIU and the data transmission buffer to a code signal for a data purpose channel and a voice purpose channel, which are separately assigned;
   a radio frequency (RF) transmitter that up-converts the modulated code signal, amplifies the up-converted signal to a predetermined transmission power, and transmits the amplified signal through a transmission antenna into free space; and
   a microprocessor that controls the transmission power of the RF transmitter in accordance with a state of the data transmission buffer, wherein the microprocessor interrupts the power transmission of the RF transmitter when there is no data for transmission in the data transmission buffer.

2. The system of claim 1, wherein the VIU comprises a modulator for modulating a voice signal from the voice purpose terminal to a PCM signal.

3. The system of claim 1, wherein the DPU transmits the data from the data purpose terminal in a packet pattern.

4. The system of claim 3, wherein the packet data comprises a subscriber's ID.

5. The system of claim 1, further comprising:
   an RF receiver that receives a voice or data signal via a reception antenna and down-converts the received signal;
   a demodulator that demodulates the down-converted voice or data signal to a code signal for the data purpose channel or the voice purpose channel;

a data reception buffer that temporarily stores therein the demodulated code signal for the data purpose channel.

6. The system of claim 5, wherein the received data is a packet data including a subscriber's ID.

7. A wireless local loop (WLL) system using a code division multiple access (CDMA) method, comprising:

a data buffer that temporarily stores therein a data signal from a public switched packet data network (PSPDN);

a CDMA modulator that respectively modulates a voice signal from a public switched telephone network (PSTN) and a data signal from the data buffer to a code signal for a data purpose channel and a voice purpose channel, which are separately assigned;

a radio frequency (RF) transmitter that up-converts the modulated code signal, amplifies the up-converted signal to a predetermined transmission power, and transmits the amplified signal through a transmission antenna into free space; and a microprocessor that controls the transmission power of the RF transmitter in accordance with a state of the data buffer, wherein the microprocessor interrupts the power transmission of the RF transmitter when there is no data for transmission in the data transmission buffer.

8. The system of claim 7, wherein the transmitted amplified signal is packet data including a subscriber's ID.

9. The system of claim 7, further comprising:

an RF receiver that receives a voice or data signal via a reception antenna and down-converts the received signal;

a demodulator that demodulates the down-converted voice or data signal to a code signal for the data purpose channel or the voice purpose channel;

a data reception buffer that temporarily stores therein the demodulated code signal for the data purpose channel.

10. The system of claim 9, wherein the received data is a packet data including a subscriber's ID.

11. A data transmission/reception method in a wireless local loop (WLL) system using a code division multiple access (CDMA) method, comprising:

assigning separately a plurality of transmission channels as a data purpose channel for data communication subscribers and voice purpose channels for general telephone subscribers;

performing a voice communication through the assigned voice purpose channels by a circuit switching method during a transmission/reception of a voice signal;

performing a data communication in common through the assigned data purposed channel by a packet switching method during the transmission/reception of a data signal;

storing the data to be transmitted temporarily in a data transmission buffer;

checking whether there exists a transmission data by monitoring the data transmission buffer;

controlling a transmission power to "0" when there is no data for transmission; and controlling the transmission power to a preset appropriate transmission power level when there is data for transmission.

12. The method of claim 11, wherein the data communication further comprises:

modulating the data signal to a code signal for the assigned data purpose channel;

up-converting the modulated code signal, amplifying the up-converted signal to the controlled transmission power level and transmitting the amplified signal through the transmission antenna;

down-converting the signal received through the reception antenna;

demodulating the down-converted signal to the code signal for the assigned data purpose channel; and transmitting the demodulated data to a destination.

13. The method of claim 12, wherein the transmission/reception data is packet data including a subscriber's ID.

14. A method comprising:

monitoring status of a buffer; and controlling transmission power of an antenna according to the status of the buffer, wherein:

said monitoring the status of the buffer comprises determining if data is stored in the buffer, and if it is determined that data is not stored in the buffer, then controlling the transmission power of the antenna to be substantially zero.

15. The method of claim 14, wherein the method is implemented in at least one of a subscriber radio interface unit and a base station.

16. The method of claim 15, wherein at least one of the subscriber radio interface unit and the base station is a code division multiple access device.

17. The method of claim 15, wherein at least one of the subscriber radio interface unit and the base station is configured to perform both voice service and data service.

18. An apparatus configured to:

monitor status of a buffer;

control transmission power of an antenna according to the status of the buffer, wherein:

said monitoring of the status of the buffer comprises determining if data is stored in the buffer, and if it is determined that data is not stored in the buffer, then controlling the transmission power of the antenna to be substantially zero.

19. The apparatus of claim 18, wherein the apparatus is one of a subscriber radio interface unit and a base station.

20. The apparatus of claim 19, wherein at least one of the subscriber radio interface unit and the station is a code division multiple access device.

21. The apparatus of claim 19, wherein at least one of the subscriber radio interface unit and the base station is configured to perform both voice service and data service.

* * * * *